US012416884B2

(12) United States Patent
Imaizumi

(10) Patent No.: US 12,416,884 B2
(45) Date of Patent: Sep. 16, 2025

(54) FIXING DEVICE AND IMAGE FORMING APPARATUS

(71) Applicant: CANON KABUSHIKI KAISHA, Tokyo (JP)

(72) Inventor: Toru Imaizumi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/186,675

(22) Filed: Mar. 20, 2023

(65) Prior Publication Data

US 2023/0229099 A1 Jul. 20, 2023

Related U.S. Application Data

(62) Division of application No. 17/850,897, filed on Jun. 27, 2022, now Pat. No. 11,635,713, which is a (Continued)

(30) Foreign Application Priority Data

Nov. 22, 2019 (JP) ................................. 2019-211823

(51) Int. Cl.
*G03G 15/20* (2006.01)

(52) U.S. Cl.
CPC ................................ *G03G 15/2025* (2013.01)

(58) Field of Classification Search
CPC ........... G03G 15/2017; G03G 15/2025; G03G 15/2028; G03G 15/2053; G03G 15/206
See application file for complete search history.

(56) References Cited

U.S. PATENT DOCUMENTS 6,456,819 B1 9/2002 Abe et al. .............. G03G 15/20
8,331,819 B2 12/2012 Fukuzawa et al. ............. 399/69
(Continued)

FOREIGN PATENT DOCUMENTS

JP H09-101695 4/1997
JP 2001-042670 2/2001
(Continued)

OTHER PUBLICATIONS

Office Action dated Sep. 26, 2023 in counterpart Japanese Application No. 2020-026484, together with English translation thereof.
(Continued)

*Primary Examiner* — Carla J Therrien
(74) *Attorney, Agent, or Firm* — Venable LLP

(57) ABSTRACT

A fixing device includes a fixing film, a heater for heating the fixing film, a heater holder including a heater holding portion holding the heater, and a pressing roller forming a nip between itself and the fixing film to be heated by the heater. In the nip, a toner image carried on a recording material is fixed. The heater holder includes an opposing surface which is provided on a side upstream of the heater holding portion with respect to a recording material feeding direction and which opposes the pressing roller, a lubricant holding portion provided on the opposing surface, for supplying a lubricant to between the fixing film and the heater, and a projected portion provided on the side upstream of the heater holding portion with respect to the recording material feeding direction and projecting toward the pressing roller from the opposing surface.

22 Claims, 9 Drawing Sheets

Related U.S. Application Data division of application No. 17/458,140, filed on Aug. 26, 2021, now Pat. No. 11,402,774, which is a division of application No. 16/953,958, filed on Nov. 20, 2020, now Pat. No. 11,131,949.

(56) References Cited

U.S. PATENT DOCUMENTS

| | | | | |
|---|---|---|---|---|
| 8,744,296 | B2 | 6/2014 | Fukuzawa et al. | 399/69 |
| 9,229,388 | B2 | 1/2016 | Imaizumi et al. | G03G 15/2017 |
| 9,235,172 | B2 | 1/2016 | Imaizumi et al. | G03G 15/2025 |
| 9,417,576 | B2 | 8/2016 | Minamishima et al. | G03G 15/206 |
| 9,507,303 | B2 | 11/2016 | Imaizumi et al. | G03G 15/2057 |
| 9,513,586 | B2 | 12/2016 | Narahara et al. | G03G 15/2053 |
| 9,829,839 | B2 | 11/2017 | Ando et al. | G03G 15/55 |
| 9,915,897 | B2 | 3/2018 | Narahara et al. | G03G 15/2053 |
| 9,983,522 | B2 | 5/2018 | Imaizumi et al. | G03G 15/2053 |
| 10,078,297 | B2 | 9/2018 | Imaizumi et al. | G03G 15/2017 |
| 10,216,130 | B2 | 2/2019 | Imaizumi et al. | G03G 15/2057 |
| 10,268,145 | B2 | 4/2019 | Ando et al. | G03G 15/55 |
| 10,310,424 | B2 | 6/2019 | An et al. | G03G 15/2057 |
| 10,503,105 | B2 | 12/2019 | Imaizumi et al. | G03G 15/2057 |
| 10,558,153 | B2 | 2/2020 | Wakatsu et al. | G03G 15/2053 |
| 10,635,032 | B2 | 4/2020 | Imaizumi et al. | G03G 15/2039 |
| 11,131,949 | B2 | 9/2021 | Imaizumi | G03G 15/20 |
| 11,402,774 | B2 | 8/2022 | Imaizumi | G03G 15/20 |
| 11,635,713 | B2 * | 4/2023 | Imaizumi | G03G 15/2025 399/325 |
| 2003/0007813 | A1 | 1/2003 | Yasui et al. | 399/324 |
| 2004/0151522 | A1 | 8/2004 | Kato et al. | 399/328 |
| 2008/0187372 | A1 | 8/2008 | Kato | 399/328 |
| 2015/0198919 | A1 | 7/2015 | Lee et al. | 399/329 |
| 2017/0010572 | A1 * | 1/2017 | Amano | G03G 15/2064 |
| 2017/0131664 | A1 | 5/2017 | Utsunomiya et al. | G03G 15/2053 |
| 2017/0219969 | A1 | 8/2017 | Umeda et al. | G03G 15/20 |
| 2018/0011434 | A1 | 1/2018 | Adachi | G03G 2215/2035 |
| 2018/0032009 | A1 * | 2/2018 | Ogura | G03G 15/2028 |
| 2018/0356757 | A1 | 12/2018 | Kobayashi et al. | G03G 15/20 |
| 2019/0155202 | A1 | 5/2019 | Imaizumi et al. | G03G 15/6573 |
| 2019/0179243 | A1 | 6/2019 | Hara et al. | G03G 15/00 |
| 2019/0204765 | A1 | 7/2019 | Morimoto | G03G 15/2064 |
| 2019/0346795 | A1 | 11/2019 | Morimoto | G03G 15/20 |
| 2019/0346796 | A1 | 11/2019 | Imaizumi | G03G 15/5004 |
| 2020/0278628 | A1 | 9/2020 | Kawaguchi et al. | G03G 15/2064 |
| 2020/0379386 | A1 | 12/2020 | Watatani et al. | G03G 15/2025 |
| 2020/0387094 | A1 | 12/2020 | Yamaguchi et al. | G03G 15/2025 |

FOREIGN PATENT DOCUMENTS

| | | |
|---|---|---|
| JP | 2004-184814 | 7/2004 |
| JP | 2007-057851 | 3/2007 |
| JP | 2008-076589 | 4/2008 |
| JP | 2008-146964 | 6/2008 |
| JP | 2017-138369 | 8/2017 |
| JP | 2018-205669 | 12/2018 |
| JP | 2019-101373 | 6/2019 |

OTHER PUBLICATIONS

Office Action dated Feb. 4, 2025 in counterpart Japanese Application No. 2024-009306, together with English translation thereof.

* cited by examiner

FIXING DEVICE AND IMAGE FORMING APPARATUS

This application is a divisional of application Ser. No. 17/850,897 filed Jun. 27, 2022, which was a division of application Ser. No. 17/458,140 filed Aug. 26, 2021, now issued as U.S. Pat. No. 11,402,774 on Aug. 2, 2022, which was a divisional of application Ser. No. 16/953,958 filed Nov. 20, 2020, now issued as U.S. U.S. Pat. No. 11,131,949 on Sep. 28, 2021; and claims priority under 35 U.S.C. § 119 to Japan Application JP 2019-211823 filed in Japan on Nov. 22, 2019; and the contents of all of which are incorporated herein by reference as if set forth in full.

FIELD OF THE INVENTION AND RELATED ART

The present invention relates to a fixing device and an image forming apparatus, and particularly relates to the fixing device for use with an electrophotographic image forming apparatus such as a copying machine or a laser printer.

As the fixing device used in the electrophotographic image forming apparatus, conventionally, a fixing device of a film heating type has been known. The fixing device of the film heating type includes a heater including a ceramic substrate and a heat generating resistor formed on the ceramic substrate, a fixing film rotating while being heated in contact with the heater, a pressing roller forming a nip in cooperation with the heater through the fixing film, and the like. A recording material on which an unfixed toner image is carried is heated in the nip while being nipped and fed, whereby the unfixed toner image on the recording material is fixed on the recording material.

In the fixing device of the film heating type, a lubricant is interposed between the heater and an inner surface of the fixing film, so that a sliding friction resistance is decreased. This lubricant is applied onto, for example, the heater in an initial stage of assembling, and is interposed between the heater and the inner surface of the fixing film. Then, the pressing roller is pressed against the fixing film toward the heater, and the fixing film is rotationally driven, so that the lubricant moves around entirety of an inner surface of the fixing film. However, when the fixing film is further continuously driven rotationally, an excessive lubricant leaks out of an end portion of the fixing film and moves around another surface of the fixing film, so that the lubricant enters the nip in some cases. When such a state is formed, there is a liability that the lubricant adheres to the recording material and thus a problem such as an image defect is caused to arise.

For example, a constitution in which grooves for storing the lubricant are provided on a side downstream, with respect to a recording material feeding direction, of a heater of a heater supporting member for supporting the heater and in positions corresponding to opposite end portions of the heater supporting member with respect to a longitudinal direction perpendicular to the recording material feeding direction or in an entire region including the opposite end portions of the heater supporting member with respect to the longitudinal direction has been proposed (Japanese Laid-Open Patent Application (JP-A) 2008-076589).

However, in the constitution disclosed in JP-A 2008-076589, when the fixing film rotates, the fixing film steadily contacts and slides on the groove portions at portions of the grooves close to the fixing film. As the lubricant applied to the heater, grease comprising base oil and a thickener which constitute a main component is used in many instances, but particularly at a high temperature, the base oil is liable to separate from the thickener. In such a case, the base oil detected from the grease stored in the grooves at the portions close to the fixing film successively leaks out of a minute gap between the inner surface of the fixing film and the heater supporting portion by a capillary phenomenon. In the case where the base oil is supplied to between the fixing film and the heater, the base oil is pressed in the nip, and thus is extended in the longitudinal direction. Further, by the capacity phenomenon, the base oil is moved from the minute gap between the inner surface of the fixing film and the heater in an end portion direction of the fixing film with respect to the longitudinal direction, so that a risk such that the base oil, i.e., the lubricant leaks out of the fixing film increases.

SUMMARY OF THE INVENTION

The present invention has been accomplished in view of the above-described circumstances. A principal object of the present invention is to provide a fixing device and an image forming apparatus which are capable of reducing a degree of leakage of a lubricant from an end portion of a fixing film with an inexpensive and simple structure while ensuring a sliding property of the fixing film.

According to an aspect of the present invention, there is provided a fixing device comprising: a fixing film; a heater configured to heat the fixing film; a heater holder including a heater holding portion holding the heater; and a pressing roller forming a nip, between itself and the fixing film to be heated by the heater, in which a toner image carried on a recording material is fixed, wherein the heater holder comprises: an opposing surface which is provided on a side upstream of the heater holding portion with respect to a recording material feeding direction and which opposes the pressing roller; a lubricant holding portion provided on the opposing surface and configured to supply a lubricant to between the fixing film and the heater; and a projected portion provided on the side upstream of the heater holding portion with respect to the recording material feeding direction and projecting toward the pressing roller from the opposing surface.

According to another aspect of the present invention, there is provided an image forming apparatus comprising: a photosensitive member on which an electrostatic latent image is formed; developing means configured to develop the electrostatic latent image with toner to form a toner image; transfer means configured to transfer the toner image onto a recording material; the above-described fixing device.

Further features of the present invention will become apparent from the following description of exemplary embodiments with reference to the attached drawings.

Figure 3:
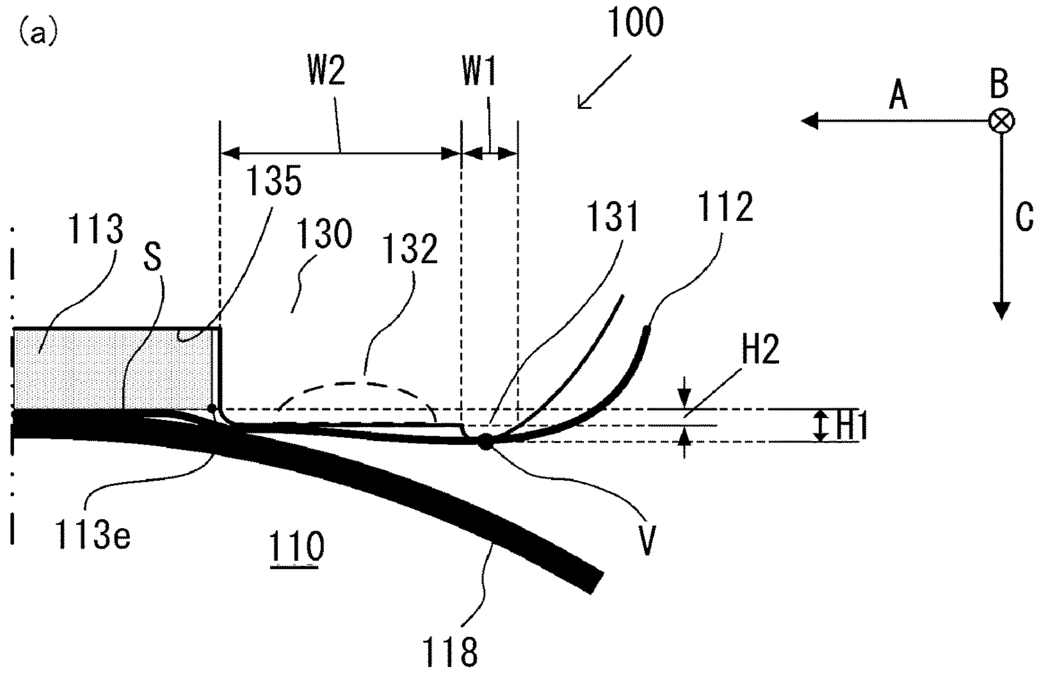
Figure 3:
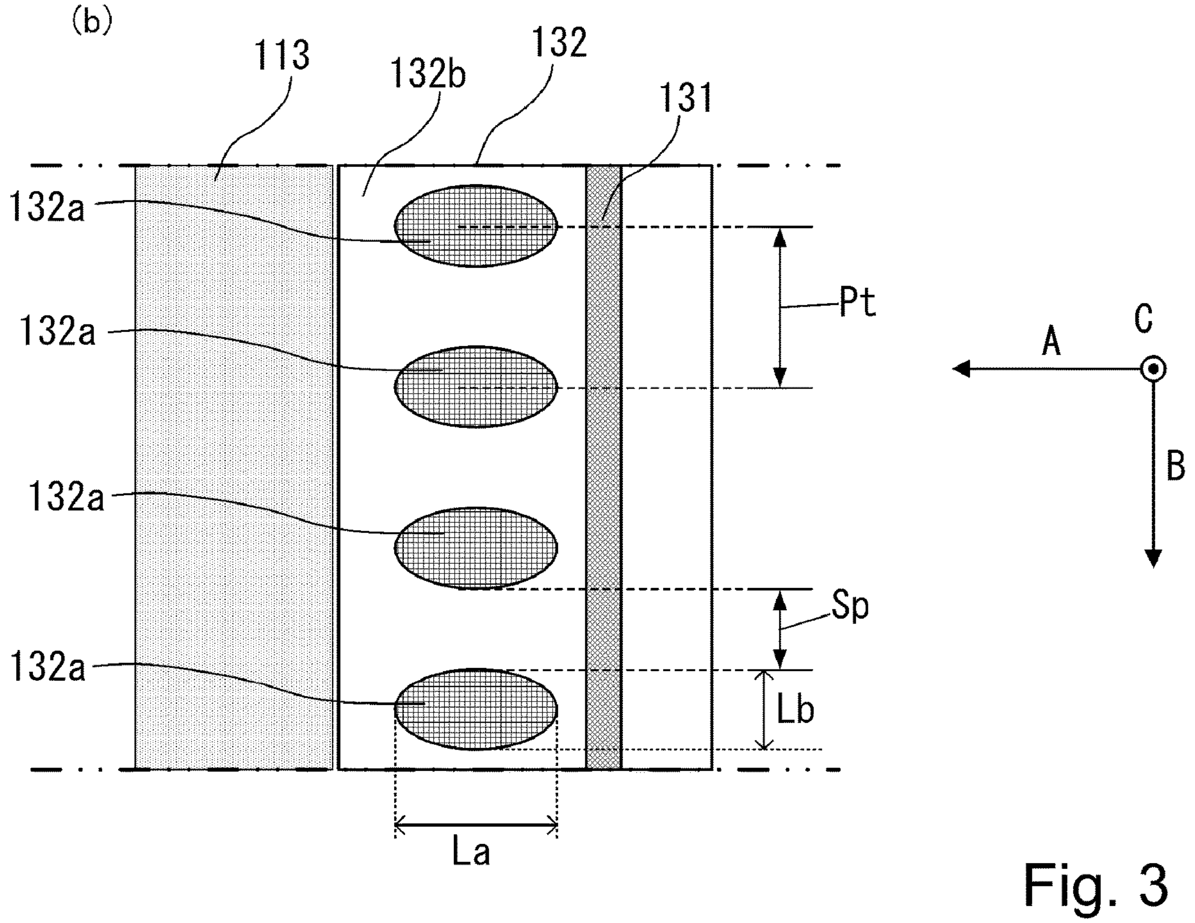

Parts (a) and (b) of FIG. 3 are schematic views showing a lubricant holding portion of the fixing device and a peripheral portion thereof in the embodiment 1.

Figure 4:
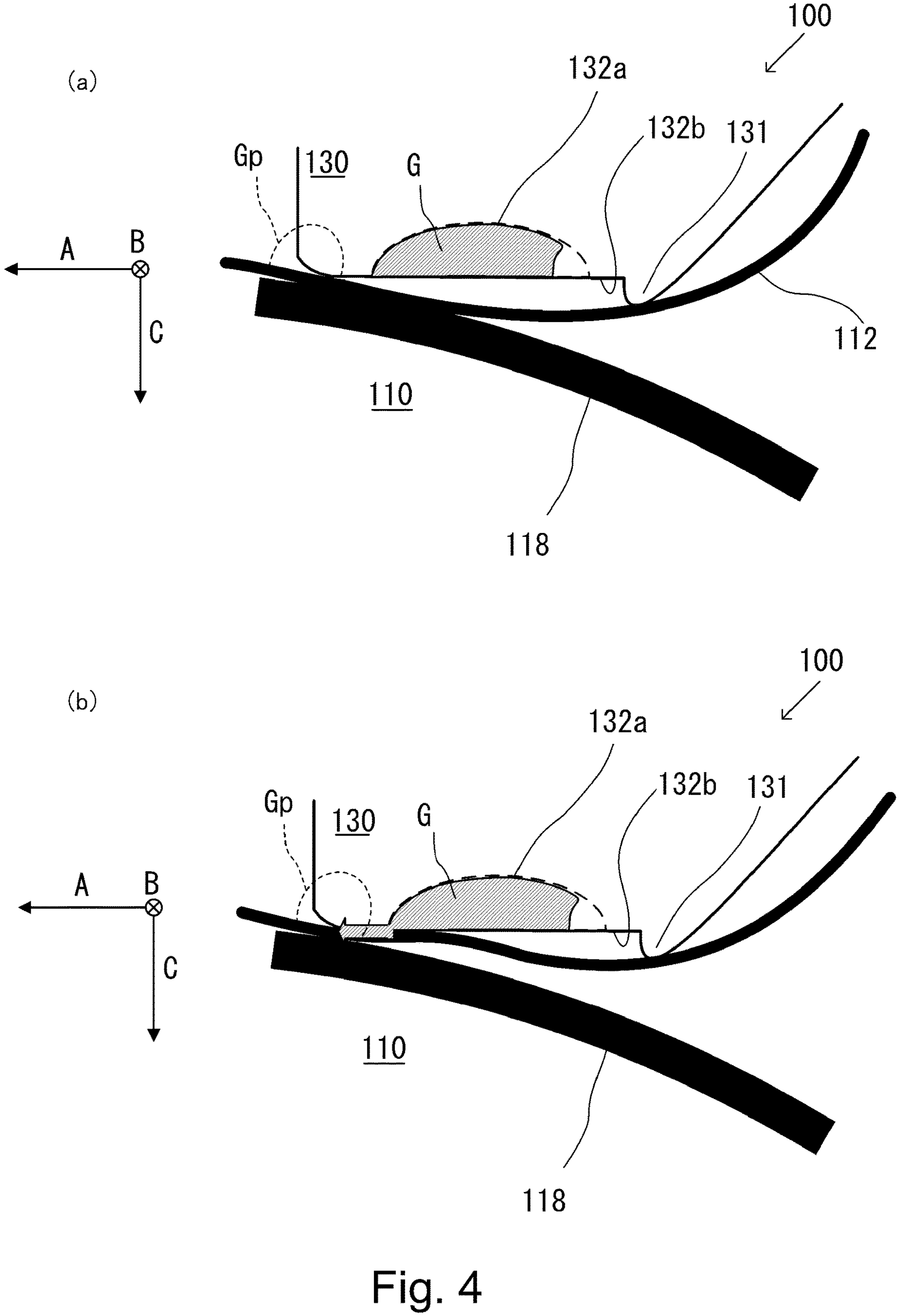

Parts (a) and (b) of FIG. 4 are schematic views for illustrating action on grease in the embodiment 1.

Figure 5:
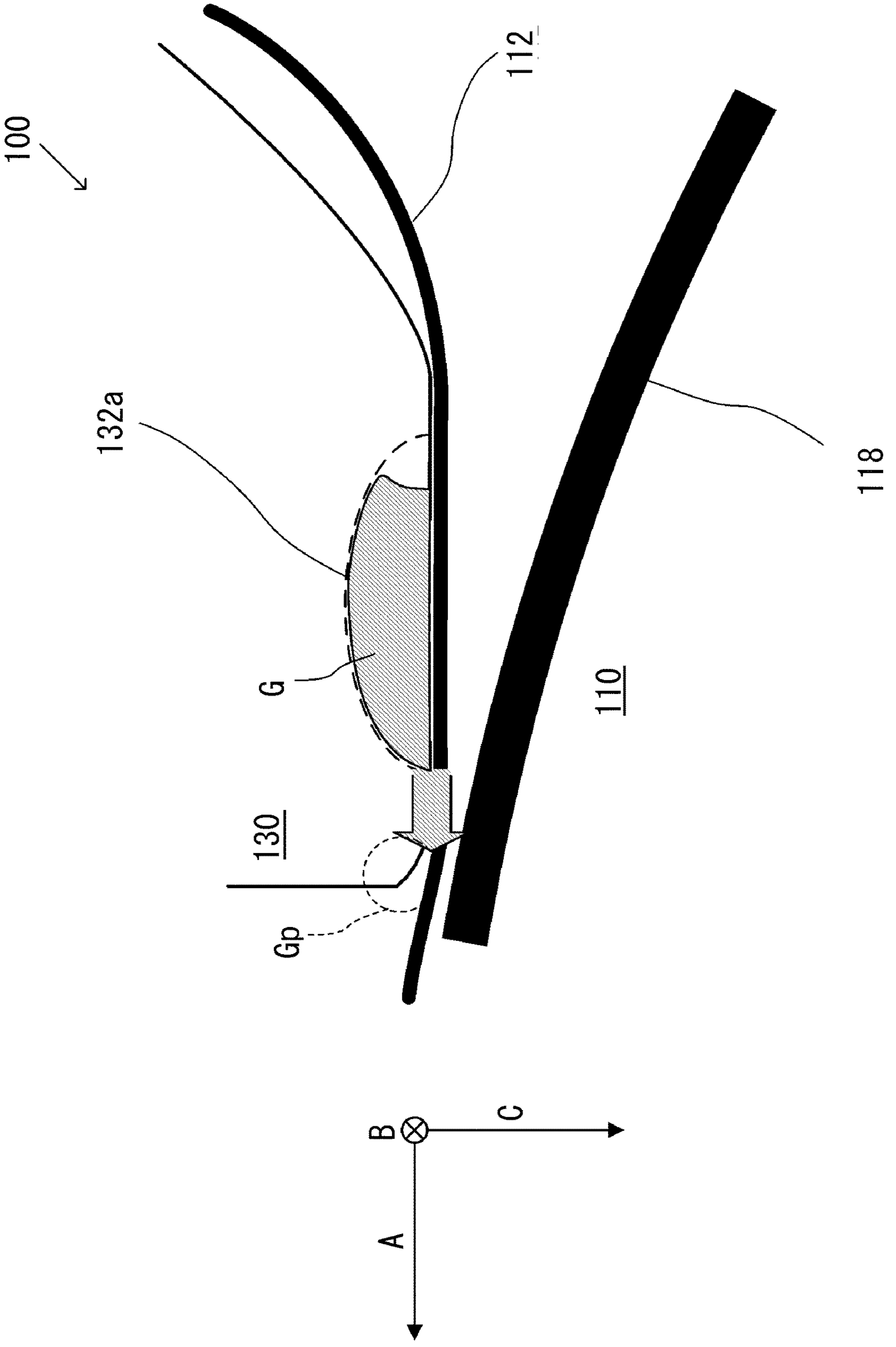

FIG. 5 is a schematic view for illustrating action on grease in a comparison example for being compared with the embodiment 1.

Figure 6:
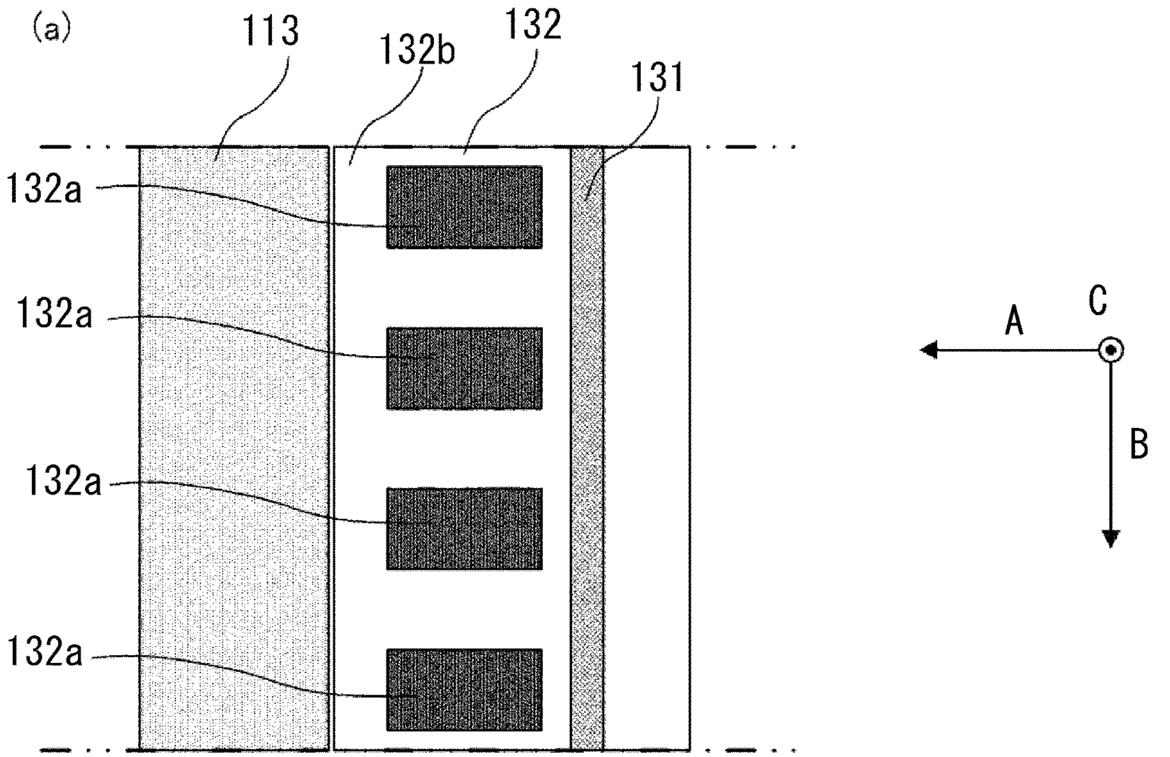
Figure 6:
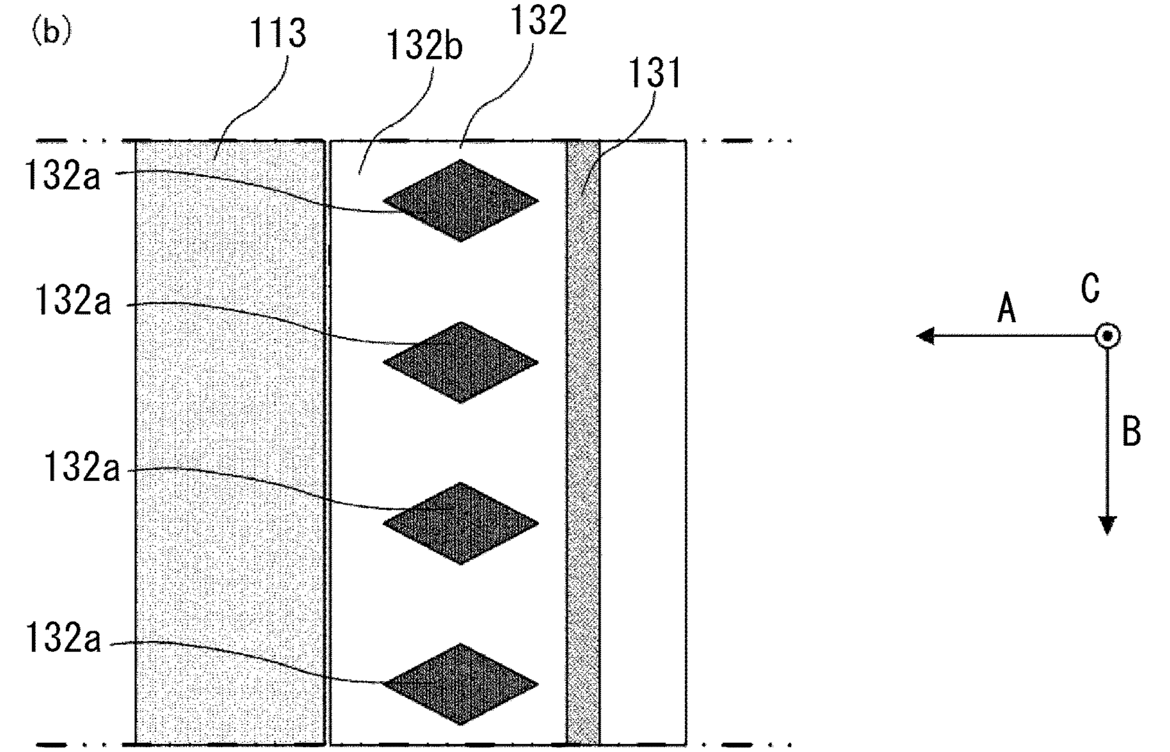

Parts (a) and (b) of FIG. 6 are schematic views each showing a modified example of a recessed portion in the embodiment 1.

Figure 7:
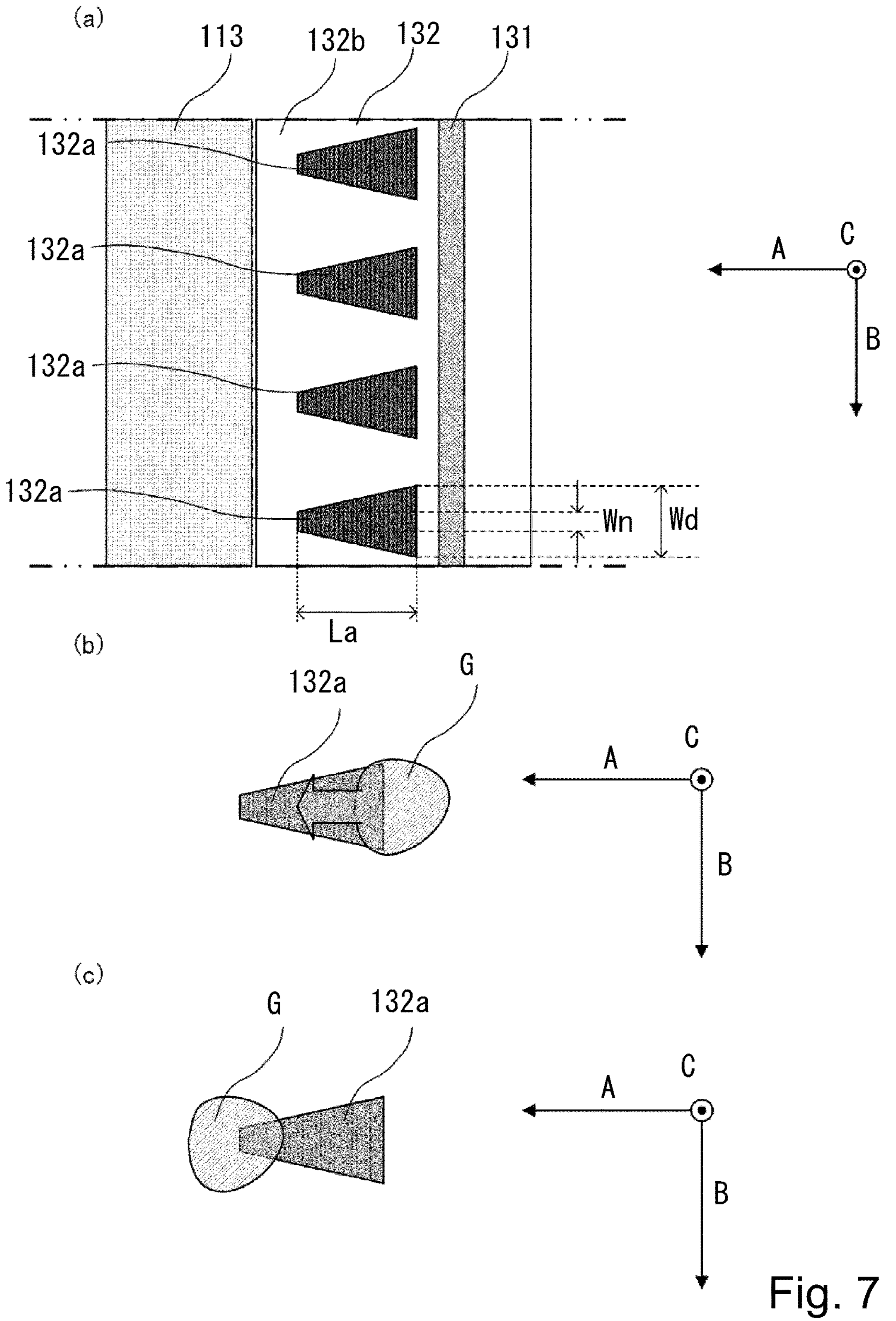

Part (a) of FIG. 7 is a schematic view for illustrating a lubricant holding portion in an embodiment 2, and parts (b) and (c) of FIG. 7 are schematic views each for illustrating action on grease in the embodiment 2.

Figure 8:
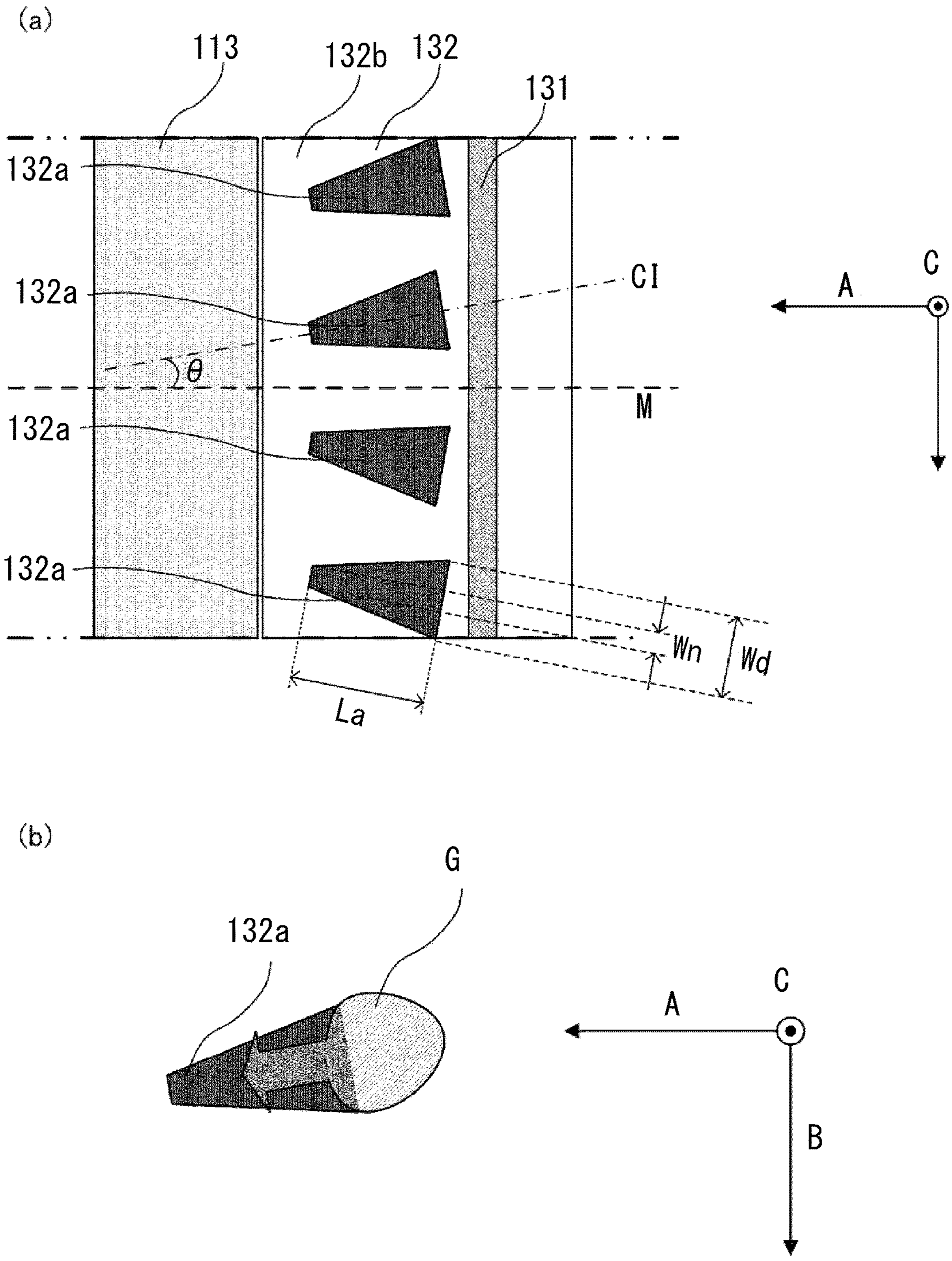

Parts (a) and (b) of FIG. 8 are schematic views for illustrating a lubricant holding portion and action on grease, respectively, in an embodiment 3.

Figure 9:
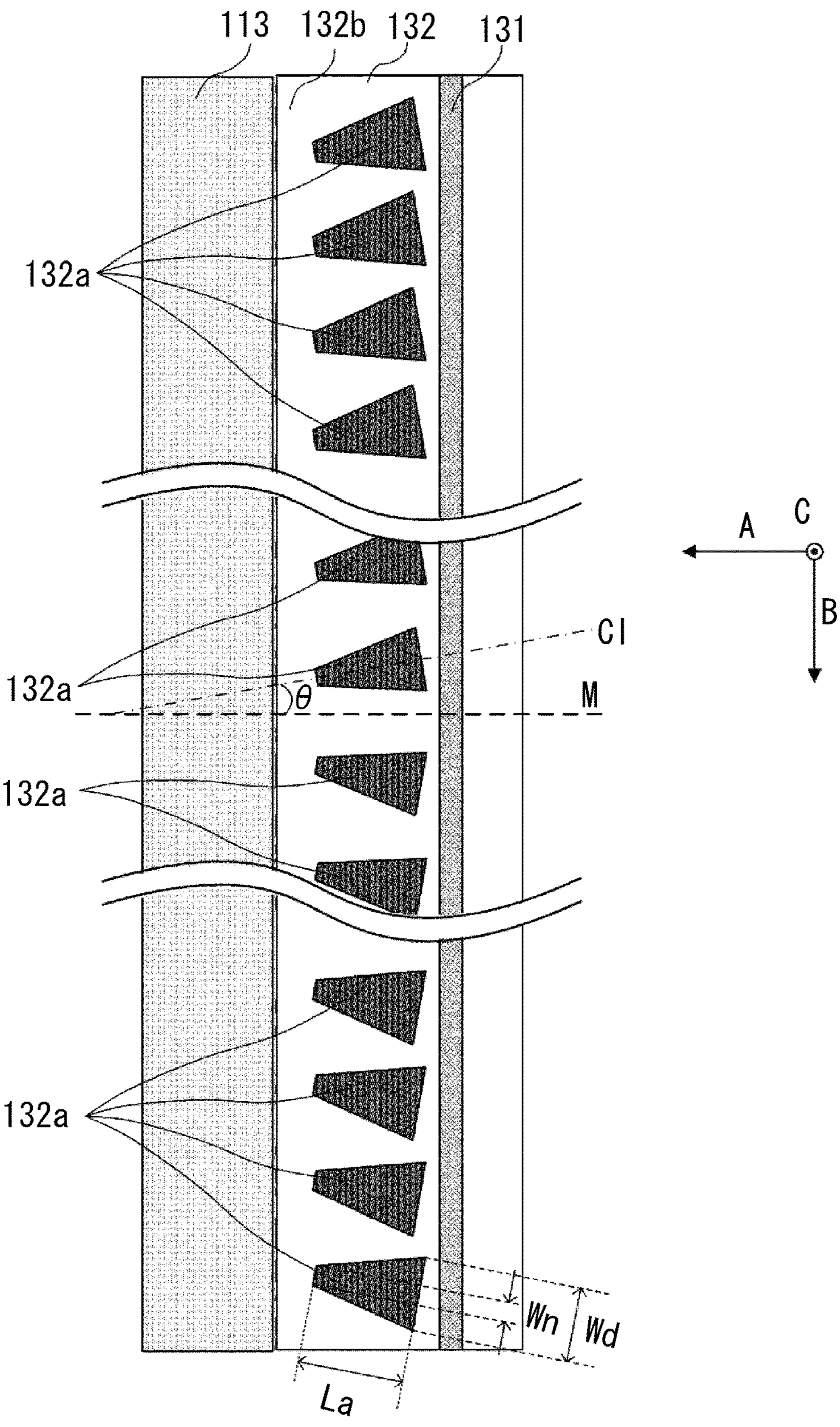

FIG. 9 is a schematic view for illustrating a lubricant holding portion in an embodiment 4.

DESCRIPTION OF THE EMBODIMENTS

In the following, embodiments for carrying out the present invention will be specifically described with reference to the drawings.

Embodiment 1

An embodiment 1 will be described below. First, a structure of a main assembly of an image forming apparatus 50 of the embodiment 1, and then, a fixing device according to the present invention will be described in detail.

Image Forming Apparatus

Figure 1:
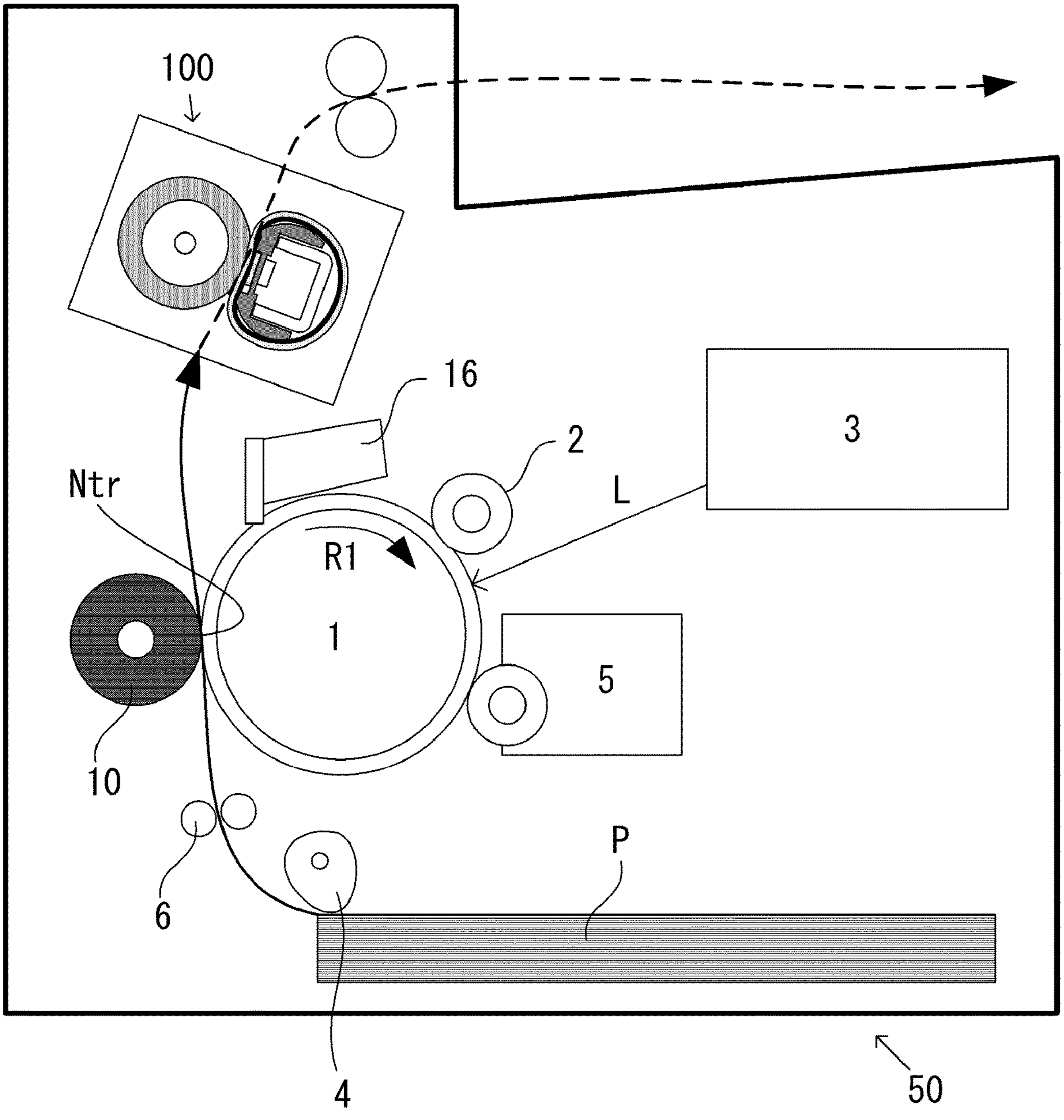
FIG. 1 is a schematic sectional view of an image forming apparatus of an embodiment 1.

When a recording material P is fed by a sheet deeding roller 4, the recording material P is fed to a transfer nip Ntr by a deeding roller 6. To a transfer roller 10, a transfer voltage of a positive polarity opposite to a charge polarity of toner is applied from a voltage source (not shown), so that a toner image on a photosensitive drum 1 is transferred onto the recording material P in the transfer nip Nst. From the surface of the photosensitive drum 1 after transfer, the toner remaining on the surface of the photosensitive drum 1 is removed by a photosensitive drum cleaner 16 provided with an elastic blade. The recording material P carrying thereon the toner image is fed to a fixing device 100, in which the toner image is heated and fixed on the surface of the recording material P. Incidentally, the image forming apparatus to which the fixing device 100 is applied is not limited to the image forming apparatus 50 shown in FIG. 1. For example, a color image forming apparatus may also be used.

Fixing Device

Figure 2:
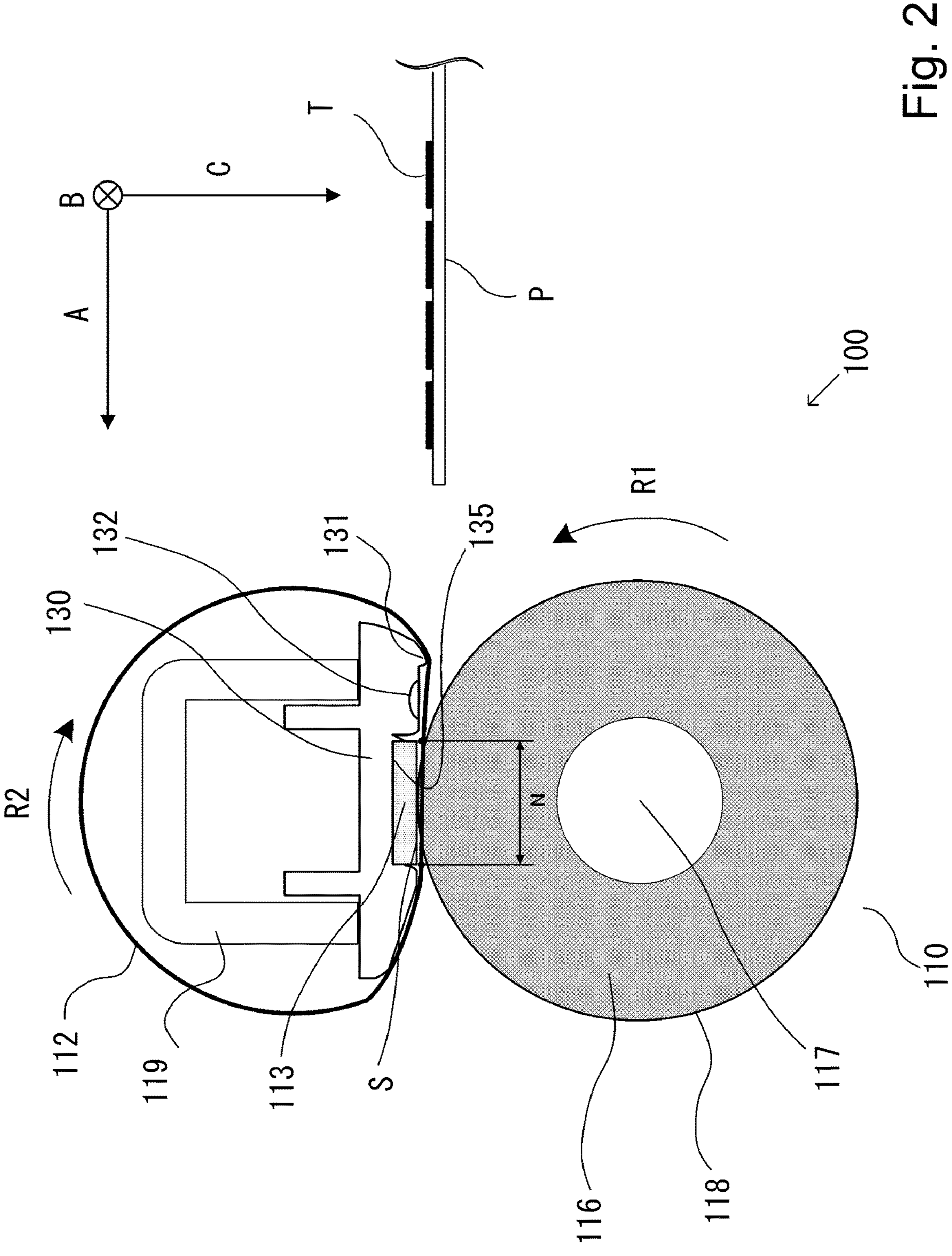
FIG. 2 is a schematic sectional view of a fixing device of the embodiment 1.

The fixing device 100 of the embodiment 1 will be described below. The fixing device 100 of the embodiment 1 is a fixing device of a film heating type for the purposes of reducing a rise time and electric power consumption. FIG. 2 is a sectional view of the fixing device 100 of the embodiment 1. Incidentally, in the following description, a deeding direction of the recording material P, a longitudinal direction of a heater holder 130 described later, and a perpendicular direction perpendicular to a sliding surface described later, which are perpendicular to each other are referred to as A, B and C, respectively.

A heater 113 is held by a heater holder 130 and is provided with a fixing film 112, which is a cylindrical belt, at a periphery thereof. The heater holder 130 includes a heater holding portion 135 holding a heater 113. The heater 113 slides on an inner surface of the fixing film 112 and heats the fixing film 112 from an inside of the fixing film 112. A pressing roller 110 presses the fixing film 112 toward the heater 113 from an outside of the fixing film 112. A region in which the pressing roller 110 and the fixing film 112 contact each other by the pressing of the pressing roller 110 is a fixing nip N. When the pressing roller 110 is driven in an arrow R1 direction in FIG. 2, the fixing film 112 receives power from the pressing roller 110 in the fixing nip N, and is rotated in an arrow R2 direction in FIG. 2 by the pressing roller 110. When the recording material P on which the toner image is transferred is fed in the feeding direction A of the recording material P indicated by an arrow in the figure and then reaches the fixing nip N, the toner image T is fixed on the recording material P.

The fixing film 112 in the embodiment 1 has an outer diameter of 18 mm in a cylindrical state in which the fixing film 112 is not deformed and has a multi-layer structure with respect to a thickness direction. The multi-layer structure of the fixing film 112 includes a base layer for holding strength of the film and a parting layer for reducing a degree of deposition of a contaminant on the surface of the film. The base layer needs a heat-resistant property for receiving heat of the heater 113 and also needs strength for sliding on the heater 113. For this reason, as a material of the base layer, metal such as stainless steel or nickel or a heat-resistant resin such as polyimide may preferably be used. In the embodiment 1, as the material of the base layer of the fixing film 112, a polyimide resin material is used, and for improving thermal conductivity and strength, a carbon-based filler was added. As regards a thickness of the base layer, the heat of the heater 113 is move easily conducted to the surface of the pressing roller 110 with a thinner (smaller) thickness, but when the thickness of the base layer is excessively thin, the strength lowers, and therefore, the thickness may preferably be about 15 μm to 100 μm, and in the embodiment 1, the thickness was 60 μm.

As a material of the parting layer of the fixing film 112, fluorine-containing resin material such as perfluoro-alkoxy (PFA) resin, polytetrafluoroethylene (PTFE) resin or tetrafluoroethylene-hexafluoropropylene (FEP) resin may preferably be used. In the embodiment 1, the PFA which is excellent in parting property and heat-resistant property in the fluorine-containing resin was used. The parting layer may be pressed by coating the base layer with a tube but may also be prepared by coating a surface of the base layer with point. In the embodiment 1, the parting layer was molded by the paint coating excellent in thin layer molding property. As regards a thickness of the parting layer, the heat of the heater 113 is move easily conducted to the surface of the fixing film 112 with a thinner (smaller) thickness, but when the thickness of the base layer is excessively thin, durability lowers, and therefore, the thickness may preferably be about 5 μm to 30 μm, and in the embodiment 1, the thickness was 10 μm. Further, an elastic layer is not used in the embodiment 1, but may also be provided between the base layer and the parting layer. In that case, as a material of the elastic layer, a silicone rubber or a fluorine-containing rubber is used.

On an inner peripheral surface side of the fixing film 112, the heater holder 130 is provided. The heater holder 130 is formed of a liquid crystal polymer resin material high in heat-resistant property in order to satisfy the heat-resistant property and rigidity. Incidentally, in the embodiment 1, as the liquid crystal polymer resin material, "SUMIKASUPER" (registered trademark) manufactured by Sumitomo Chemical Company is used. Further, the heater holder 130 includes a recess-shaped portion (heater holding portion 135) in cross-section where the heater 113 is held. The fixing film 112 is loosely fitted around the heater holder 130, whereby the heater holder 130 also performs a function of guiding a rotation of the fixing film 112. The heater holder 130 relates to a feature of the embodiment 1, and therefore will be described later in detail.

A pressing stay 119 is provided along the longitudinal direction B of the heater holder 130. The pressing stay 119 is constituted by subjecting a metal plate high in rigidity, such as stainless steel to bending in order to uniformly press the heater holder 130 with respect to the longitudinal direction B. The pressing roller 110 in this embodiment is 20 mm in outer diameter and includes an iron core (metal) 117 of 13 mm in outer diameter and a 3.5 mm-thick elastic layer 116. As a material of the elastic layer, a solid rubber or a foam rubber is used. The foam rubber is low in thermal capacity and thermal conductivity and thus heat of the surface of the pressing roller 110 is not readily absorbed therein, and therefore a surface temperature easily increases, so that there is an advantage such that a rise time of the fixing device can be shortened. In the embodiment 1, a foam rubber obtained by foaming a silicone rubber was used.

A small outer diameter of the pressing roller 110 is effective in suppressing the thermal capacity, but when the outer diameter is excessively small, a width of the fixing nip N becomes narrow, so that a proper diameter is needed. Therefore, in the embodiment 1, the outer diameter of the pressing roller 110 was 20 mm. Also as regards the thickness of the elastic layer 116, a proper thickness is needed since heat is dissipated into the core metal. Therefore, in the embodiment 1, the thickness of the elastic layer 116 was 3.5 mm. On the elastic layer, as a toner parting layer, a parting layer 118 made of the PFA resin material is formed. The parting layer 118 may be prepared by coating the elastic layer 116 with a tube or by coating the surface of the elastic layer 116 with paint similarly as in the case of the parting layer of the fixing film 112, but in the embodiment 1, the tube excellent in durability was used. As the material of the parting layer 118 other than the PFA, the fluorine-containing resin material such as the PTFE or the FEP or a rubber material such as the fluorine-containing rubber or the silicone rubber may also be used. As regards surface hardness of the pressing roller 110, with lower surface hardness, the width of the fixing nip N can be obtained at lower pressure. In the embodiment 1, the pressing roller 110 of 50° in Asker-C hardness (load: 4.9 N) was used. The pressing roller 110 is pressed against the fixing film 112 toward the heater 113 by pressing means (not shown). A pressing force (pressure) was 14 kgf in total. The width of the fixing nip N with respect to the feeding direction A in the embodiment 1 is about 6.0 mm over the longitudinal direction B. The pressing roller 110 is rotated in the arrow R1 direction at a surface movement speed of 200 mm/sec by a rotating means (not shown).

The heater 113 in the embodiment 1 is general-purpose heater used in the fixing device of the film heating type, and a heater prepared by proving a heat generating resistor on a ceramic substrate is used. As the heater 113, an about 10 μm-thick heat generating resistor of Ag/Pd (silver/palladium) is applied onto a surface of a 1 mm-thick alumina substrate by screen printing, and thereon, a 50 μm-thick glass layer is coated for protecting the heat generating resistor and for ensuring sliding property. The thus-prepared heater 113 was used. Further, depending on a signal of a temperature detecting element (not shown) for detecting a temperature of the ceramic substrate or the fixing film 112, a current passed through the heat generating resistor is appropriately controlled, so that a temperature of the heater 113 is adjusted. The heater 113 is fixedly supported by being engaged in the heater holding portion 135 which is a groove provided on the heater holder 130. In the embodiment 1, in order to efficiently conduct the heat to the recording material, with respect to the feeding direction A, a center of the heater 113 and a center of the pressing roller 110 are aligned with each other.

Onto the heater 113, a lubricant for being interposed between the heater 113 and the fixing film 112 is applied. As the lubricant applied onto the heater 113, fluorine-containing grease was used in the embodiment 1. Specifically, grease in which perfluoropolyether (PFPE) oil is used as base oil and polytetrafluoroethylene (PTFE) powder is used as a thickener in mixture with the base oil was used.

An effect of the embodiment 1 is particularly effective in the case where a ratio of the base oil to a total amount of the grease used is relatively large, and is particularly effective in the case where grease of 80 wt. % or more in ratio of the base oil was used. The grease high in ratio of the base oil is relatively small in amount of the thickener and viscosity becomes low, and therefore, a sliding property is good, but a function of holding the base oil by the thickener is weak. For that reason, there is a need to make up for a function of holding the grease and the base oil by the constitution of the embodiment 1. In the embodiment 1, grease of 85 wt. % in ratio of the base oil was used. The grease was applied in an amount of 200 mg by spray application (coating) onto a sliding surface S, which is a contact surface between the fixing film 112 and the heater 113, over a region width of 210 mm which is somewhat shorter than a pressing region width of 220 mm with respect to the longitudinal direction B of the pressing roller 110. A projected portion 131 and a lubricant holding portion 132 will be described later.

Feature of Embodiment 1

A shape of the heater holder 130, particularly the lubricant holding portion 132 provided on the heater holder 130, which is a feature of the embodiment 1 will be described while making reference to FIG. 3. Part (a) of FIG. 3 is a schematic view of a principal portion, showing a positional relationship between the heater 113, the fixing film 112, the projected portion 131 and the lubricant holding portion 132 in an enlarged manner. Part (b) of FIG. 3 is a schematic view of the principal portion in the neighborhood of the lubricant holding portion 132 as seen from the pressing roller 110 side. The heater holder 130 in the embodiment 1 includes the lubricant holding portion 132 and the projected portion 131. The lubricant holding portion 132 is provided upstream of the heater holding portion 135 with respect to the feeding direction A. The projected portion 131 is provided upstream of the lubricant holding portion 132 with respect to the feeding direction A and projects toward the pressing roller 110 compared with an opposing surface described later. The opposing surface projects toward the pressing roller 110 than the sliding surface S, in other words, the fixing nip N is, so that the projected portion 131 projects toward the pressing roller 110 than the lubricant holding portion 132 is.

The heater holder 130 includes the projected portion 131 projecting toward the pressing roller 110 side than the heater 113 is, on a side upstream of the fixing nip N with respect to the feeding direction A. A degree of projection of the projected portion 131 from the sliding surface S (hereinafter, this degree is referred to as a projection height H1) is required to be a certain height in order to regulate a locus of the fixing film 112. However, when the projection height H1 is excessively high, it causes prevention of entrance of the recording material P into the fixing nip N, and therefore the projection height H1 may desirably be about 0.1 mm to 1.0 mm. In the embodiment 1, the projection height H1 of a top point V of the projected portion 131 from the sliding surface S is 0.4 mm.

Between the fixing nip N and the projected portion 131, the lubricant holding portion 132 for holding the grease is provided. A height H2 of the lubricant holding portion 132 from the sliding surface S is needed to be set at a value lower than the projection height H1 of the projected portion 131 (H2<H1). Further, the lubricant holding portion 131 is made higher than the sliding surface S. This is because when the fixing film 112 rotates in the arrow R2 direction, an edge portion 113*e* of the heater 113 on an upstream side of the heater 113 with respect to the feeding direction A and on the pressing roller 110 side of the heater 113 (hereinafter, this edge portion is referred to as an upstream edge portion) is protected from rubbing against the inner surface of the fixing film 112. In the embodiment 1, the height H2 of the lubricant holding portion 132 from the sliding surface S was 0.2 mm. Therefore, a height of the projected portion 131 from the lubricant holding portion 132 is H1−H2=0.2 mm. Further, a width W1 of the projected portion 131 with respect to the feeding direction A is 0.5 mm. Further, a width W2 of the lubricant holding portion 132 with respect to the feeding direction A is larger (wider) than the width W1 of the projected portion 131 with respect to the feeding direction A (W>W1). In the embodiment 1, the projected portion 131 was provided by changing the shape of the heater holder 130, but the projected portion 131 may also be provided as a member separate from the heater holder 130 and may also be formed of a material of the heater holder 130.

Lubricant Holding Portion

The lubricant holding portion 132 includes a flat surface portion 132*b* as the opposing surface opposing the pressing roller 110, and the flat surface portion 132*b* includes a plurality of recessed portions 132*a* each recessed in a direction in which the recessed portion 132*a* is distant from the pressing roller 110. Incidentally, the opposing surface is the flat surface portion 132*b*, but is not limited to the flat surface. The lubricant holding portion 132 is provided with the plurality of recessed portions 132*a* for holding the grease over the longitudinal direction B. The recessed portions 132*a* may desirably be disposed independently with respect to the longitudinal direction B from the viewpoint such that the held grease is not intended to spread in the longitudinal direction B to the extent possible. Further, from the viewpoint such that the grease is held and is prevented from excessively flowing onto the sliding surface S, with respect to the feeding direction A, it is desirable that each recessed portion 132*a* does not penetrate through the heater holding portion (groove portion) 135 holding the heater 113. It is further desirable that as regards a shape of each recessed portion 132*a*, a length with respect to the feeding direction A is made longer than a length with respect to the longitudinal direction B from the viewpoint such that the grease is moved in a diameter toward the fixing nip N, i.e., in the feeding direction A. That is, when the length of each recessed portion 132*a* of the lubricant holding portion 132 with respect to the feeding direction A is La and the length of each recessed portion 132*a* is Lb, La>Lb may desirably be satisfied.

In the embodiment 1, each recessed portion 132*a* has an elliptical shape in cross-section on the flat surface portion 132*b*, as shown in part (b) of FIG. 3. Each recessed portion 132*a* has a smoothly recessed shape such that the length La with respect to the feeding direction A is 2.0 mm, the length Lb with respect to the longitudinal direction B is 1.0 mm, and a depth is 0.5 mm. That is, as regards the lubricant holding portion 132, each recessed portion 132*a* may only be required to have a recessed shape such that a cross-sectional area of each recessed portion 132*a* parallel to the flat surface portion 132*b* becomes smaller with an increasing distance from the pressing roller 110. In other words, as regards the lubricant holding portion 132, a cross-sectional shape of each recessed portion 132*a* perpendicular to the longitudinal direction B may also be a rectangular groove, other than an arcuate groove which has a shape (bow shape) as indicated by a broken line of part (a) of FIG. 3. Incidentally, in the case where each recessed portion 132*a* of the lubricant holding portion 132 is the rectangular groove, a constitution in which a cross-sectional area parallel to the flat surface portion 132*b* is the same irrespective of a distance from the pressing roller 110 and a constitution in which the cross-sectional area made small with an increasing distance from the pressing roller 110 may also be employed.

A pitch Pt of adjacent recessed portions 132*a* (i.e., a distance between centers of adjacent parts of the lubricant holding portion 132 with respect to the longitudinal direction B) and an interval Sp (predetermined interval) between the adjacent recessed portions 132*a* determined as follows. When an expansion amount of the base oil in the case where the grease (lubricant) is added dropwise to the flat surface portion 132*b* of the heater holder 130 in amount per (one) pitch of the base oil contained in the grease applied is a diameter D (mm), the interval Sp between the adjacent recessed portions 132*a* may desirably be set a value which is D or less (Sp<D). By setting so, even in the case where the base oil is separated from the grease adhering to between the recessed portions 132*a*, the base oil can be caught and held by the recessed portions 132*a*. Thus, the interval between the recessed portions 132*a* is smaller than the diameter in which the base oil expands in the case where the base oil is added dropwise to the flat surface portion 132*b* in an amount per (one) recessed portion 132*a*. In the embodiment 1, the pitch Pt and the interval Sp are set so that the base oil is added dropwise to the flat surface portion 132*b* in the amount per recessed portion 132*a* is smaller than the diameter in which the base oil expands.

In the embodiment 1, the recessed portions 132*a* are disposed with the certain pitch of 2 mm (Pt=2 mm), and therefore, the amount per pitch of the base oil of 200×0.85/210×2=1.6 mg. The base oil expansion amount when the base oil is added dropwise to the flat surface portion 132*b* of the heater holder 130 in this amount was about 2.2 mm in the embodiment 1 from a result of study by the present inventor. For that reason, in the embodiment 1, the interval between the recessed portions 132*a* was set at 1.0 mm. Further, from the viewpoint of ease of holding of the base oil by the recessed portion 132*a*, a contact angle of the base oil to the heater holder 130 by a liquid droplet method may desirably be 90° or less, and is about 20° to 40° in the embodiment 1. In the embodiment 1, many recessed portions 132*a* are disposed independently over the pressing region width of the pressing roller 110 with respect to the longitudinal direction B as described above.

The fixing film 112 is backed up by the fixing nip N, the heater holder 130 and the projected portion 131. The fixing film 112 originally has a cylindrical shape, and therefore, in the neighborhood of the projected portion 131 positioned upstream of the fixing nip N, the fixing film 112 rotates while contacting the projected portion 131 by a restoring force by which the shape of the fixing film 112 is returned to the cylindrical shape. The projected portion 131 projects toward the pressing roller 110 direction than the sliding surface S of the heater 113 is, and therefore, a locus of the fixing film 112 is regulated by the projected portion 131. For this reason, as shown in part (a) of FIG. 2, the lubricant holding portion 132 is disposed in the neighborhood of the inner surface of the fixing film 112 on a side upstream of the fixing nip N without being contacted steadily to the fixing film 112 at strong pressure.

Immediately after the fixing device 100 is assembled, the grease is applied onto the sliding surface S, but the fixing film 112 is rotated by performing a fixing operation, so that the grease adheres to the inner surface of the fixing film 112 and the fixing film 112 rotates. A part of the grease reaches the lubricant holding portion 132 with rotation of the fixing film 112 and is held in the recessed portions 132*a* of the lubricant holding portion 132. The grease once held in the recessed portions 132*a* is not readily contacted directly and steadily to the inner surface of the fixing film 112 because the fixing film 112 is regulated by the projected portion 131.

Comparison with Comparison Example

Next, action on the grease G by the constitution of the embodiment 1 will be described while making comparison with a comparison example with reference to FIGS. 4 and 5. Parts (a) and (b) of FIG. 4 are schematic views for illustrating action of supply of the grease G in the embodiment 1. FIG. 5 is a schematic view for illustrating action of supply of the grease G in a comparison example in which the projected portion 131 is not provided. Incidentally, constituent elements similar to those described above are represented by the same reference numerals or symbols and will be omitted from illustration.

In the comparison example shown in FIG. 5, the projected portion 131 is not provided and therefore, the inner surface of the fixing film 112 steadily contacts the recessed portions 132*a* of the lubricant holding portion 132 and the grease G stored therein. When the fixing film 112 steadily contacts the recessed portions 132*a*, the grease G always moves in the sliding surface (portion) S direction, so that the grease G is excessively supplied. Particularly, when the grease G steadily contacts the fixing film 112, the grease G is liable to become a high temperature and thus the base oil is liable to be separated from the thickener. The separated base oil of the grease G moves from a minute gap Gp (indicated by a broken line) between the inner surface of the fixing film 112 and the heater holder 130 in a direction of the sliding surface S as indicated by an arrow in FIG. 5 by a capillary phenomenon. When the amount of the grease G supplied to the sliding surface S becomes excessive, the grease G pressed in the fixing nip N also expands in the longitudinal direction B by being pressed and deformed, and therefore is gradually pushed out in a direction of an end portion of the fixing film 112 with respect to the longitudinal direction B, so that there is a liability that the grease G leaks out of the end portion of the fixing film 112 with respect to the longitudinal direction B sooner or later.

In comparison with this comparison example, in the embodiment 1, the locus of the fixing film 112 is regulated by the projected portion 131 as shown in part (a) of FIG. 4, and therefore, the fixing film 112 does not steadily contact the recessed portions 132*a*, and therefore, excessive supply of the grease G to the sliding surface S is suppressed. On the other hand, the fixing film 112 has a characteristic such that when the fixing film 112 is cooled depending on an ambient temperature after being heated and then is left standing for a long time, the fixing film 112 follows a shape of the fixing nip N and is plastically deformed to some extent. In the case where the following fixing operation is performed after the fixing film 112 is left standing for the long time, the locus of the fixing film 112 when the fixing film 112 starts rotation is different from a normal locus, so that the fixing film 112 exhibits behavior such that the fixing film 112 fluctuates to some extent between the fixing nip N and the projected portion 131.

At that time, as shown in part (b) of FIG. 4, the fixing film 112 temporarily contacts the recessed portions 132*a*, and by the capillary phenomenon, the grease G is supplied in a slight amount to the sliding surface S through the gap Gp as shown by the arrow in the figure. However, when the fixing film 112 is heated and becomes the high temperature, the shape of the fixing film 112 deforms is returned to the original (cylindrical) shape. For this reason, as shown in part (a) of FIG. 3, the locus of the fixing film 112 is stabilized again, and the fixing film 112 does not steadily contact the recessed portions 132*a*, so that the amount of excessive supply of the grease G to the sliding surface S is suppressed. By that, the amount of the grease G positioned at the sliding surface S becomes an appropriate amount, and therefore, it is possible to reduce a degree of an occurrence of a phenomenon such that the grease G pressed in the fixing nip N is pushed out in the longitudinal direction B and leaks out of the end portion of the fixing film 112 with respect to the longitudinal direction B.

As described above, in the constitution of the embodiment 1, the grease G is supplied periodically in a proper amount to the sliding surface S while being held by the lubricant holding portion 132. By this, it is possible to reduce a degree of leakage of the grease G out of the end portion of the fixing film 112 with respect to the longitudinal direction B while maintaining a sliding property.

Incidentally, in the embodiment 1, the elliptical recessed portions 132*a* were used, but even when recessed portions 132*a* formed in other shapes are used, an effect of the embodiment 1 is achieved. Parts (a) and (b) of FIG. 6 are schematic views showing the recessed portions 132*a* formed in other shapes, in which constituent elements similar to those described above are represented by the same reference numerals or symbols and will be omitted from description. For example, the present invention is also applicable to even other shapes such as a rectangular shape as shown in part (a) of FIG. 6 and a diamond shape as shown in part (b) of FIG. 6. Thus, with respect to a direction perpendicular to the feeding direction and the longitudinal direction of the heater holder 130 perpendicular to the feeding direction, when the flat surface portion 132*b* is seen from the pressing roller 110 side, the lubricant holding portion 132 may also include recessed portions 132*a* formed in the elliptical shape, the rectangular shape or the diamond shape. Incidentally, in parts (a) and (b) of FIG. 6, a shape of a cross-section of each recessed portion 132*a* perpendicular to the longitudinal direction B may also be various shapes such as a curved line shape, a tapered shape and another rectangular shape. Further, in the embodiment 1, the recessed portions 132*a* were provided by changing the shape of the heater holder 130, but a separate member may also be disposed in the recessed portions 132*a* by providing nonwoven fabric impregnated with the grease or a pad in the recessed portions 132*a*, for example.

As described above, according to the embodiment 1, with expansive and simple structure, it is possible to reduce a degree of leakage of the lubricant out of the end portion of the fixing film while ensuring the sliding property of the fixing film.

Embodiment 2

An embodiment 2 will be described below. In the embodiment 2, only a portion relating to the shape of the recessed portions 132*a* is different from that in the embodiment 1. Other constitutions are similar to those in the embodiment 1, and therefore, detailed structures of the image forming apparatus 50 and the fixing device 100 will be omitted from description. Each of the recessed portions 132*a* in the second embodiment is such that for the cross-sectional shape thereof on the flat surface portion 132*b*, with respect to the longitudinal direction B, a length of a portion near to the sliding surface S, in other words, the fixing nip N is shorter than a portion far from the sliding surface S.

Feature of Embodiment 2

A shape of the recessed portions 132*a* which is a feature of the embodiment 2 will be described using part (a) of FIG. 7. In the embodiment 2, as shown in part (a) of FIG. 7, a width of each recessed portion 132*a* is changed between the portion near to the sliding surface S and the portion far from the sliding surface S, so that each recessed portion 132*a* has a wedge-like shape. In the embodiment 2, setting is made so that a width Wn of the portion near to the sliding surface S is smaller than a width Wd of the portion far from the sliding surface S. That is, each recessed portion 132*a* has a shape such that as regards the width thereof with respect to the longitudinal direction B, the width Wn of the portion near to the sliding surface S and the width Wd of the portion far from the sliding surface S satisfies the relationship of: $Wn<Wd$. Specifically, the width Wn of the portion near to the sliding surface S is 0.3 mm, and the width Wd of the portion far from the sliding surface S is 1.2 mm. Incidentally, the length La of each recessed portion 132*a* with respect to the feeding direction A was 2.0 mm similarly as in the embodiment 1. Incidentally, in part (a) of FIG. 7, a shape of a cross-section of each recessed portion 132*a* perpendicular to the longitudinal direction B may also be various shapes such as a curved line shape, a tapered shape and another rectangular shape.

Effect of Embodiment 2

A further effect in the embodiment 2 will be described using parts (b) and (c) of FIG. 7. For example, the case where the grease G adhered to the portion of the recessed portion 132*a* far from the sliding surface S as shown in part (b) of FIG. 7 and the case where the grease G adhered to the portion of the recessed portion 132*a* near to the sliding surface S as shown in part (c) of FIG. 7 will be considered. In the case where the base oil is separated from the grease G in a state of part (b) of FIG. 7, the width of the recessed portion 132*a* with respect to the longitudinal direction B gradually narrows as an associated portion approaches the sliding surface S, and therefore, the base oil easily moves on the recessed portion 132*a* in the sliding surface S direction by the capillary phenomenon. On the other hand, in the case where the base oil is separated from the grease G in a state of part (c) of FIG. 7, the base oil of the grease G does not readily move toward the portion far from the sliding surface S. That is, by changing the shape of each recessed portion 132*a* to the shape in the embodiment 2, the base oil of the grease G can be localized at the portion of each recessed portion 132*a* nearer to the sliding surface S. Of the base oil held by the recessed portion 132*a*, the base oil to be supplied to the sliding surface S is successively used by being supplied principally from the portion near to the portion. At that time, of the base oil held by the recessed portion 132*a*, from the base oil held at the portion far from the sliding surface S, the base oil is supplied to a position of the portion of the recessed portion 132*a* near to the sliding surface S. By this action, the base oil held by the recessed portions 132*a* is successively supplied and used, and therefore, of the grease G held in the recessed portions 132*a*, the grease G which does not contribute to lubrication and which is held as it is can be decreased in amount.

As described above, according to the embodiment 2, with expansive and simple structure, it is possible to reduce a degree of leakage of the lubricant out of the end portion of the fixing film while ensuring the sliding property of the fixing film.

Embodiment 3

An embodiment 3 will be described below. In the embodiment 3, only a portion relating to the arrangement of the recessed portions 132*a* is different from that in the embodiment 2. Other constitutions are similar to those in the embodiment 2, and therefore, detailed structures of the image forming apparatus 50 and the fixing device 100 will be omitted from description.

Feature of Embodiment 3

An arrangement of the recessed portions 132*a* which is a feature of the embodiment 3 will be described using part (a) of FIG. 8. A shape of the recessed portions 132*a* is similar to the shape of the recessed portions 132*a* in the embodiment 2, and therefore, will be omitted from description. In the embodiment 3, as shown in parts (a) and (b) of FIG. 8, a phantom line on which a center of the recording material P which will pass through a deeding passage is referred to as a phantom line M, and with respect to the phantom line M extending in the feeding direction, each of the recessed portions 132*a* is disposed so that a longitudinal direction thereof is inclined. In other words, a constitution in which each recessed portion 132*a* has a shape such that the portion near to the sliding surface S is oriented toward the phantom line M is employed. Specifically, with respect to the feeding direction A of the recording material P, an angle at which a phantom line Cl connecting a center of the width Wn on one end (downstream side) of the recessed portion 132*a* and a center of the width Wd on the other end (upstream side) of the recessed portion 132*a* is inclined relative to the phantom line M is referred to as θ. In the embodiment 3, the recessed portions 132*a* are disposed by being inclined with $\theta=10°$ with respect to the phantom line (center line) M. Incidentally, as arrangement of the plurality of recessed portions 132*a*, the angle θ may also be changed depending on a position of an associated recessed portion 132*a* with respect to the longitudinal direction. For example, as to the arrangement of the plurality of recessed portions 132*a*, the angle θ may also be changed so as to become larger with a position closer to the end portion with respect to the longitudinal direction.

Effect of Embodiment 3

A further effect in the embodiment 3 will be described using part (b) of FIG. 8. As described above in the embodiment 2, the base oil separated from the grease G moves toward the portion near to the sliding surface S by the capillary phenomenon. At this time, as described above, the recessed portions 132*a* are inclined toward the phantom line M on which the center of the recording material P which will pass through the deeding passage passes, and therefore, a movement direction of the base oil is also oriented by being inclined toward the phantom line M.

By this action, an effect of collecting the base oil, which is expanded in the longitudinal direction B being pressed in the fixing nip N, toward the phantom line M on which the center of the recording material P which will pass through the deeding passage passes is created. For that reason, in the embodiment 3, the degree of the leakage of the grease G out of the end portion of the fixing film 112 with respect to the longitudinal direction B can be further reduced. Incidentally, the constitution of the embodiment 3 in which the recessed portions 132*a* are inclined with respect to the phantom line M may also be applied to the recessed portions 132*a* having the shapes shown in part (b) of FIG. 3 and parts (a) and (b) of FIG. 6 in the embodiment 1.

As described above, according to the embodiment 3, with expansive and simple structure, it is possible to reduce a degree of leakage of the lubricant out of the end portion of the fixing film while ensuring the sliding property of the fixing film.

Embodiment 4

An embodiment 4 will be described below. In the embodiment 4, only a portion where the shape and the arrangement of the recessed portions 132*a* are changed depending on positions of the recessed portions 132 with respect to the longitudinal direction B is different from that in the embodiment 3. Other constitutions are similar to those in the embodiment 2, and therefore, detailed structures of the image forming apparatus 50 and the fixing device 100 will be omitted from description. In the embodiment 4, with respect to a perpendicular direction perpendicular to the feeding direction A and the longitudinal direction B of the heater holder 130 perpendicular to the feeding direction A, when the flat surface portion 132 is seen from the pressing roller 110 side, the areas of the plurality of recessed portions 132*a* change depending on the positions of the recessed portions 132*a* with respect to the longitudinal direction. Specifically, as regards the areas of the recessed portions 132*a*, compared with the recessed portions 132*a* positioned at a central portion with respect to the longitudinal direction, the recessed portions 132*a* positioned at end portions with respect to the longitudinal direction have larger areas. Further, compared with an interval between adjacent recessed portions 132*a* positioned at the central portion with respect to the longitudinal direction, an interval between adjacent recessed portions 132*a* positioned at each of the end portions with respect to the longitudinal direction is narrower. In the following, this will be described using the drawing.

Feature of Embodiment 4

The arrangement of the recessed portions 132*a* which is a feature of the embodiment 4 will be described using FIG. 9. In the embodiment 4, the area (cross-sectional area on the flat surface portion 132*b*) and the pitch are made different from each other between the central portion (in the neighborhood of the phantom line M) with respect to the longitudinal direction B and each of the end portions. At the central portion with respect to the longitudinal direction B, both the area and the pitch of each of the recessed portions 132*a* are similar to those in the embodiment 3. On the other hand, at each of the end portions with respect to the longitudinal direction B, the widths (Wn and Wd) are made 1.17 times the widths at the central portion, and the pitch P1 is reduced to 18 mm compared with the case of the central portion. That is, the recessed portions 132*a* in the embodiment 4 are larger in width with respect to the longitudinal direction B with the position closer to each of the end portions with respect to the longitudinal direction B. In other words, the recessed portions 132*a* are larger in area with the position closer to each end portion with respect to the longitudinal direction B. Further, the recessed portions 132*a* are narrower in pitch Pt (or the interval Sp) with the position closer to each end portion with respect to the longitudinal direction B. Incidentally, in the embodiment 4, both the width and the pitch (interval) were changed depending on the position with respect to the longitudinal direction B, but either one of the width and the pitch may also be changed depending on the position with respect to the longitudinal direction B. Further, as to the arrangement of the plurality of recessed portions 132*a*, the angle θ formed by the longitudinal direction of the recessed portion 132*a* and the phantom line M may also be changed so as to become larger with the position closer to the end portion with respect to the longitudinal direction.

Effect of Embodiment 4

In the embodiment 4, between the central portion and the end portion with respect to the longitudinal direction B, the area and the pitch of the recessed portions 132*a* are made different, and therefore, retention power of the grease G by the lubricant holding portion 132 can be made different with respect to the longitudinal direction B. As regards the fixing device 100 of the film heating type as in the embodiment 4, when the recording material P narrow in length (paper width) with respect to the longitudinal direction B is fed, thermal capacity is small, and therefore, the member constituting the fixing device 100 is liable to increase in temperature at end portions with respect to the longitudinal direction B. That is, a phenomenon which is called end portion temperature rise occurs.

In such a situation, compared with the central portion, separation of the base oil from the grease G at each end portion with respect to the longitudinal direction B is accelerated, so that there is a possibility that the base oil separated from the grease G at each end portion with respect to the longitudinal direction B leaks out of the end portion of the fixing film 112 and that the base oil component of the grease G at the end portion with respect to the longitudinal direction B is used up. In such a case, by employing the constitution as in the embodiment 4, the grease G retention power at each end portion with respect to the longitudinal direction B is enhanced, so that even when the recording material P with a narrow paper width is fed, the grease G in a proper amount can be supplied to the sliding surface S while holding the grease G. Incidentally, the constitution of the embodiment 4 in which the recessed portions 132*a* are changed in area and/or pitch depending on the positions thereof with respect to the longitudinal direction B may also be applied to the recessed portions 132*a* having the shapes shown in part (b) of FIG. 3 and parts (a) and (b) of FIG. 6 in the embodiment 1.

As described above, according to the embodiment 4, with expansive and simple structure, it is possible to reduce a degree of leakage of the lubricant out of the end portion of the fixing film while ensuring the sliding property of the fixing film.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-211823 filed on Nov. 22, 2019, which is hereby incorporated by reference herein in its entirety.

What is claimed is:

1. A fixing device comprising:

a cylindrical fixing film;

a heater configured to heat said fixing film, said heater being arranged in an internal space of said fixing film such that a longitudinal direction thereof is along a longitudinal direction of said fixing film;

a heater holder including a heater holding portion holding said heater; and a pressing roller forming a nip, between itself and said fixing film to be heated by said heater, in which a toner image carried on a recording material is fixed, the pressing roller forming the nip with the heater via the fixing film, wherein said heater holder comprises:

an opposing surface which is provided on a side upstream of said heater holding portion with respect to a recording material feeding direction and which opposes said pressing roller; and plural lubricant holding portions arranged on said opposing surface in the longitudinal direction and arranged in an area where said heater exists with respect to the longitudinal direction, the plural lubricant holding portions being configured to supply a lubricant to between said fixing film and said heater, each lubricant holding portion of the plural lubricant holding portions having four corners, a side on an upstream side in the recording material feeding direction and a side on a downstream side in the recording material feeding direction, and extending in the recording material feeding direction, and said side on the upstream side and said side on the downstream side overlapping when viewed in the recording material feeding direction, wherein those of said plural lubricant holding portions that are positioned on an end side of said heater holder in the longitudinal direction are inclined so that a first phantom line, which passes through a center of said side of said lubricant holding portion on the upstream side and a center of said side of said lubricant holding portion on the downstream side, is inclined toward a second phantom line through which a center of the recording material in the longitudinal direction passes as the first phantom line goes to the downstream side of the first phantom line when viewed in a direction which is vertical to both the longitudinal direction and the recording material feeding direction, and wherein, with respect to the recording material feeding direction, an inclination angle of a lubricant holding portion of said plural lubricant holding portions located close to said end side of said heater holder in the longitudinal direction is larger than an inclination angle of a lubricant holding portion of said plural lubricant holding portions located close to the second phantom line through which the center of the recording material passes in the longitudinal direction.

2. A fixing device according to claim 1, wherein said opposing surface is projected more toward said pressing roller than the nip is projected.

3. A fixing device according to claim 1, wherein when said opposing surface is seen from said pressing roller side in a direction perpendicular to the feeding direction and perpendicular to a longitudinal direction of said heater holder perpendicular to the feeding direction, said plural lubricant holding portions have a trapezoid shape.

4. A fixing device according to claim 1, wherein when said opposing surface is seen from said pressing roller side in a direction perpendicular to the feeding direction and perpendicular to a longitudinal direction of said heater holder perpendicular to the feeding direction, with respect to the longitudinal direction of said heater holder, a length of a lubricant holding portion of said plural lubricant holding portions is longer at a portion far from the nip than at a portion near to the nip.

5. A fixing device according to claim 1, wherein a longitudinal direction of said plural lubricant holding portions forms a predetermined angle with respect to the feeding direction.

6. A fixing device according to claim 1, wherein said plural lubricant holding portions are provided at regular intervals.

7. A fixing device according to claim 1, wherein when viewed in a direction that is vertical to both the longitudinal direction and the recording material feeding direction, respective areas of said plural lubricant holding portions change depending on positions thereof with respect to the longitudinal direction and/or intervals of said plural lubricant holding portions change depending on the positions thereof with respect to the longitudinal direction.

8. A fixing device according to claim 1, wherein when viewed in a direction which is vertical to both the longitudinal direction and the recording material feeding direction, each of areas of said plural lubricant holding portions is larger at an end portion than at a central portion with respect to the longitudinal direction and/or each of intervals of said plural lubricant holding portions is narrower at the end portion than at the central portion with respect to the longitudinal direction.

9. A fixing device according to claim 1, wherein said lubricant at least contains base oil having a contact angle of 90° or less with respect to said heater holder, and wherein each of the intervals of said plural lubricant holding portions is smaller than a diameter in which said base oil extends when said base oil in an amount held by one lubricant holding portion is added dropwise to said opposing surface.

10. An image forming apparatus comprising:

a photosensitive member on which an electrostatic latent image is formed;

a developing unit configured to develop the electrostatic latent image with toner to form a toner image;

a transfer unit configured to transfer the toner image onto a recording material; and the fixing device according to claim 1, configured to fix the toner image carried by the recording material.

11. A fixing device according to claim 1, wherein the side downstream of said heater holding portion of the heater holder is a flat portion.

12. A fixing device according to claim 1, wherein plural lubricant holding portions are not formed on a side downstream of said heater holding portion of said heater holder with respect to the recording material feeding direction.

13. A fixing device comprising:

a cylindrical fixing film;

a heater arranged in an internal space of said fixing film such that a longitudinal direction thereof is along a longitudinal direction of the fixing film;

a heater holder arranged in the internal space of said fixing film such that the longitudinal direction thereof is along the longitudinal direction of the fixing film and including a function to guide said fixing film which is rotating; and a pressing roller forming a nip between itself and said fixing film in contact with an outer peripheral surface of said fixing film and by nipping said fixing film with said heater, wherein a recording material is fed by the nip and heated with heat of said heater, and an unfixed toner image carried by the on the recording material is fixed on the recording material, wherein on a fixing film guiding surface in an upstream side of said heater of said heater holder with respect to a rotational direction of said fixing film, a plurality of recessed portions, which have a side on the upstream side and a side on a downstream side which overlap with each other when viewed in a recording material feeding direction, and four corners and which extend in the rotational direction and in which a lubricant is entered, are arranged in an area where said heater exists with respect to the longitudinal direction and side by side with respect to the longitudinal direction, wherein when viewed in a direction which is vertical to both the longitudinal direction and the rotational direction, a first phantom line connecting a center of said side of a recessed portion of the plurality of said recessed portions on the upstream side and a center of said side of said recessed portion of the plurality of said recessed portions on the downstream side is inclined so as to be close to a second phantom line through which a center of the recording material with respect to the longitudinal direction passes as the plurality of said recessed portions go to a downstream side of the recording material feeding direction, and wherein inclination angles of the first phantom line of the plurality of said recessed portions are larger toward the end portion of said heater holder in the longitudinal direction.

14. A fixing device according to claim 13, wherein said opposing surface is projected more toward said pressing roller than said nip is projected.

15. A fixing device according to claim 13, wherein when said opposing surface is seen from said pressing roller side in a direction perpendicular to the feeding direction and perpendicular to a longitudinal direction of said heater holder perpendicular to the feeding direction, said plurality of recessed portions have a trapezoid shape.

16. A fixing device according to claim 13, wherein a longitudinal direction of said plurality of recessed portions forms a predetermined angle with respect to the feeding direction.

17. A fixing device according to claim 13, wherein said plurality of recessed portions are provided at regular intervals.

18. A fixing device according to claim 13, wherein said lubricant at least contains base oil having a contact angle of 90° or less with respect to said heater holder, and wherein each of the intervals of the plurality of said recessed portions is smaller than a diameter in which said base oil extends when said base oil in an amount held by one recessed portion is added dropwise to said opposing surface.

19. An image forming apparatus comprising:

a photosensitive member on which an electrostatic latent image is formed;

a developing unit configured to develop the electrostatic latent image with toner to form a toner image;

a transfer unit configured to transfer the toner image onto a recording material; and the fixing device according to claim 13, configured to fix the toner image carried by the recording material.

20. A fixing device according to claim 13, wherein recessed portions are not formed in the fixing film guiding portion on a side downstream of said heater of said heater holder with respect to the rotational direction of said fixing film.

21. A fixing device comprising:

a cylindrical fixing film;

a heater configured to heat said fixing film, said heater being arranged in an internal space of said fixing film such that a longitudinal direction thereof is along a longitudinal direction of said fixing film;

a heater holder including a heater holding portion holding said heater; and a pressing roller forming a nip, between itself and said fixing film to be heated by said heater, in which a toner image carried on a recording material is fixed, the pressing roller forming the nip with the heater via the fixing film, wherein said heater holder comprises:

a first opposing surface which is provided on a side upstream of said heater holding portion with respect to a recording material feeding direction and which opposes said pressing roller; and plural lubricant holding portions arranged on said first opposing surface in the longitudinal direction and arranged in an area where said heater exists with respect to the longitudinal direction, wherein those of said plural lubricant holding portions that are positioned on an end side of said heater holder in the longitudinal direction are inclined so that the lubricant flows in a direction toward a phantom line through which a center of the recording material in the longitudinal direction passes when viewed in a direction which is vertical to both the longitudinal direction and the recording material feeding direction, wherein a second opposing surface which is provided on a downstream side of said heater holding portion with respect to the recording material feeding direction and which opposes said pressing roller is flat, and wherein an inclination angle, with respect to the recording material feeding direction, of one of said plural lubricant holding portions located close to said end side of said heater holder in the longitudinal direction is larger than an inclination angle, with respect to the recording material feeding direction, of another one of said plural lubricant holding portions located close to the phantom line through which the center of the recording material in the longitudinal direction passes.

22. A fixing device according to claim 21, wherein said plural lubricant holding portions are not formed on the downstream side of said heater holding portion of said heater holder with respect to the recording material feeding direction.

* * * * *